United States Patent
Hansen et al.

(10) Patent No.: US 10,775,354 B2
(45) Date of Patent: Sep. 15, 2020

(54) AUTONOMOUS AMBIENT AIR SAMPLING SYSTEM FOR MONITORING SEMI-VOLATILE/NON-VOLATILE ORGANIC COMPOUNDS

(71) Applicant: BRIGHAM YOUNG UNIVERSITY, Provo, UT (US)

(72) Inventors: Jaron Hansen, Springville, UT (US); Paul Cropper, Spanish Fork, UT (US); Delbert J. Eatough, Provo, UT (US); Robert Cary, Tigard, OR (US); Lin Lin, South Easton, MA (US); Lee Hansen, Saratoga Springs, UT (US)

(73) Assignee: Brigham Young University, Provo, UT (US)

( * ) Notice: Subject to any disclaimer, the term of this patent is extended or adjusted under 35 U.S.C. 154(b) by 129 days.

(21) Appl. No.: 14/874,196

(22) Filed: Oct. 2, 2015

(65) Prior Publication Data

US 2016/0097748 A1 Apr. 7, 2016

Related U.S. Application Data

(60) Provisional application No. 62/058,757, filed on Oct. 2, 2014.

(51) Int. Cl.
| | |
|---|---|
| *G01N 30/72* | (2006.01) |
| *G01N 30/06* | (2006.01) |
| *G01N 30/16* | (2006.01) |
| *G01N 30/12* | (2006.01) |
| *G01N 30/88* | (2006.01) |
| *G01N 30/02* | (2006.01) |

(52) U.S. Cl.
CPC ......... *G01N 30/7206* (2013.01); *G01N 30/06* (2013.01); *G01N 30/16* (2013.01); *G01N 2030/025* (2013.01); *G01N 2030/128* (2013.01); *G01N 2030/884* (2013.01)

(58) Field of Classification Search
CPC .... G01N 30/7206; G01N 30/06; G01N 30/16; G01N 2030/025; G01N 2030/128; G01N 2030/8804
USPC .............................................. 73/23.37, 23.42
See application file for complete search history.

(56) References Cited

U.S. PATENT DOCUMENTS

| | | | |
|---|---|---|---|
| 5,135,549 A | 8/1992 | Phillips | |
| 5,588,988 A * | 12/1996 | Gerstel | G01N 30/12 |
| | | | 73/23.41 |
| 5,713,964 A * | 2/1998 | Schreiner | A62C 99/0081 |
| | | | 44/355 |
| 5,783,756 A | 7/1998 | Xiong | |
| 6,054,683 A | 4/2000 | Bremer | |
| 6,345,545 B1 | 2/2002 | Linker | |
| 6,442,997 B1 | 9/2002 | Megerle | |
| 6,947,132 B1 * | 9/2005 | Boss | G01J 3/44 |
| | | | 356/301 |

(Continued)

*Primary Examiner* — Herbert K Roberts
*Assistant Examiner* — John M Royston
(74) *Attorney, Agent, or Firm* — Morriss O'Bryant Compagni Cannon, PLLC

(57) ABSTRACT

An automated ambient air sampling system and method for monitoring organic compounds that may provide continuous data, the system including a thermal desorption system, an injection port, a pre-concentration system, a gas chromatograph and an ion trap mass spectrometer, wherein an air sampling chamber may also function as a thermal desorption chamber.

9 Claims, 7 Drawing Sheets

(56) References Cited

U.S. PATENT DOCUMENTS

| | | | |
|---|---|---|---|
| 7,299,711 B1 | 11/2007 | Linker | |
| 7,964,028 B2 | 6/2011 | Harvey | |
| 2003/0230152 A1* | 12/2003 | McGill | B01D 45/08 |
| | | | 73/864.34 |
| 2005/0284209 A1* | 12/2005 | Tipler | G01N 30/12 |
| | | | 73/23.42 |
| 2007/0277589 A1* | 12/2007 | Harden | G01N 27/622 |
| | | | 73/31.03 |
| 2009/0090197 A1* | 4/2009 | Finlay | G01N 1/2214 |
| | | | 73/863.12 |
| 2009/0309016 A1* | 12/2009 | Almirall | B82Y 15/00 |
| | | | 250/282 |
| 2010/0126284 A1* | 5/2010 | Boudries | G01N 1/405 |
| | | | 73/863.12 |
| 2010/0203652 A1* | 8/2010 | Harvey | B01J 20/26 |
| | | | 436/518 |
| 2012/0329166 A1* | 12/2012 | Skarping | G01F 1/68 |
| | | | 436/106 |
| 2014/0057836 A1* | 2/2014 | Bara | C07K 5/08 |
| | | | 514/4.3 |
| 2014/0260536 A1* | 9/2014 | Sadowski | G01N 30/8675 |
| | | | 73/23.37 |
| 2015/0246339 A1* | 9/2015 | Guerriero | B01D 39/086 |
| | | | 436/177 |
| 2015/0260694 A1* | 9/2015 | Matsuoka | G01N 30/30 |
| | | | 73/23.41 |
| 2017/0014805 A1* | 1/2017 | Al-Hazmi | B01J 37/086 |

\* cited by examiner

AUTONOMOUS AMBIENT AIR SAMPLING SYSTEM FOR MONITORING SEMI-VOLATILE/NON-VOLATILE ORGANIC COMPOUNDS

This invention was made with government support under Grant number ATM-0407695 awarded by the National Science Foundation. The government has certain rights in the invention.

DESCRIPTION OF RELATED ART

The miniaturization of gas chromatography (GC) provides for portable/in-field separation and detection of analytes, and may be applied in many areas, including environmental, military, and industrial. The primary aspects of miniaturizing gas chromatographs may include reducing the size, power consumption, and obtaining fast temperature programming. Separation of analytes in GC may be achieved due to the chemical equilibria of the analytes between the stationary phase and the carrier gas, and this equilibrium is strongly influenced by temperature. Miniaturized systems heat faster than contemporary oven bath systems, therefore faster separation can be achieved.

A gas chromatograph may basically be composed of an injector, a column assembly and a detector. Many methods for miniaturizing gas chromatographs have been developed, with particular efforts made to miniaturize the column assembly. Most of these systems utilized resistive heating techniques to provide rapid heating and analysis. These resistive heating techniques may be broadly categorized by two heating methods: (1) assemblies that utilize external fixtures to indirectly heat the GC capillary column, and (2) heaters that extend along the length of the capillary column for direct heating.

Indirect column heating using a fixture has been accomplished in multiple ways. One of the earliest methods was introduced by PerkinElmer in 1962. Their unique design was composed of a capillary column embedded into a flat metal disk, which was placed on a similarly shaped heating disk. PerkinElmer reported that this model provided extremely accurate temperature control, though miniaturization was not necessarily a goal and the thermal mass and power consumption was likely high. A cylindrical fixture was developed by Sides and Cates by wrapping a GC capillary column on the outside of a tubular heat conductor, and applying heat on the inside of the tube. The inside of the tube also incorporated a fan for cooling.

Another method was described by Roundehler et al., who placed a cylindrically wound column in a small diameter stainless steel sheath, with a small air gap between the sheath and the column, and the sheath was then used as the heater. While minimizing the power was not a key aspect of this method, they obtained heating rates up to 100° C./s. Maswadeh et al. also designed a cylindrical metal fixture with deep grooves on both the interior and exterior of the cylinder. They wound multiple layers of capillary column into the interior groove, and placed the heater in the exterior groove, and covered both grooves with insulation. They reported good chromatographic performance, and the typical power consumption was under 20 W for a 1-m capillary column.

As opposed to using a fixture, directly heating the capillary column may provide the advantage of lower thermal mass due to the lack of a fixture, therefore less power is consumed by the system. These methods may also provide very fast GC separation. The difficulties of these systems usually arise due to electrical shortages of heaters that extend the length of the capillary column. Accurately measuring the temperature of these systems may also be an issue. While much progress has been achieved in overcoming these obstacles, this document focuses on a GC assembly that utilizes an external fixture.

In addition to miniaturizing the GC capillary column assembly itself, many systems utilize pre-concentration/focusing in order to concentrate the analytes prior to separation and improve detection. Pre-concentration can either be performed using chemical interactions of the stationary phase (e.g. sorption tubes, coated capillary traps), or can be done cryogenically by cold trapping. While these approaches are important to extending GC in-field use, pre-concentration may not have been applied for enhanced separation of non-volatile polar organic compounds such as levoglucosan.

Tropospheric fine particulate matter (PM) poses serious health risks and has a significant impact on global climate change. The organic fraction of PM (i.e. organic aerosol) ranges from 10-90% of the PM total mass. Monitoring the organic aerosol composition is a significant challenge due to the hundreds of compounds present, and their broad range of chemical properties. However, routinely monitoring these organic compounds would provide invaluable information to better characterize pollution sources, and further understanding of secondary organic aerosol formation.

Traditionally, filter collection and impaction techniques have been used for identification and quantification of organic aerosol species. However, analysis of samples collected by filtration or impaction require laboratory analysis and bench top equipment, therefore the cost is high and time resolution is poor. Rapid methods to analyze samples collected by filtration or impaction without liquid extraction have been developed. However, these methods do not capture important diurnal variations in ambient organic compound (OC) concentrations, and time-relevant correlations between OCs and other pollutants cannot be made. Therefore, a need exists to develop in-field techniques to continuously monitor individual PM OC species.

Field monitoring of ambient particles has been significantly enhanced with the development and commercialization of particle beam mass spectrometry methods such as the Aerodyne aerosol mass spectrometer (AMS) and the TSI aerosol time-of-flight mass spectrometer. Instruments such as these provide important time-resolved, and size-resolved chemical composition data including total carbon and inorganic species. However, these instruments are not designed to identify or quantify organic compounds due to the harsh ionization techniques used and large sample matrix effects. These instruments are also limited in use be-cause of their size and limited portability.

The embodiments of this invention demonstrate the use of a new automated in-field detection system for measurement of organic com-pounds in PM using filtration, followed by thermal desorption into a compact GC-MS system. Automated sampling and the use of a compact GC-MS system make it possible to easily deploy the instrument in the field for long-term monitoring

BRIEF SUMMARY

The present invention is an automated ambient air sampling system and method for monitoring organic compounds that may provide continuous data, the system including a thermal desorption system, an injection port, a pre-concentration system, a gas chromatograph and an ion trap mass spectrometer, wherein an air sampling chamber may also function as a thermal desorption chamber.

These and other embodiments of the present invention will become apparent to those skilled in the art from a consideration of the following detailed description taken in combination with the accompanying drawings.

DETAILED DESCRIPTION

Reference will now be made to the drawings in which the various embodiments of the present invention will be given numerical designations and in which the embodiments will be discussed so as to enable one skilled in the art to make and use the invention. It is to be understood that the following description illustrates embodiments of the present invention, and should not be viewed as narrowing the claims which follow.

This invention may be used anywhere air pollution is a problem such as urban environments, industrial sites, and laboratory settings. Examples of users include: regulatory agencies such as the EPA, or state air quality management; laboratories which study air pollution; industries which release organic compounds into the atmosphere (oil and gas industry); and military for the study of chemical warfare.

Monitoring organic compounds in air pollution is currently very difficult and time consuming. The organic composition of pollution, specifically particulate matter, may be unknown. There is a significant need to automate the sampling process, so that continuous information may be obtained. This information would contribute greatly to our understanding of pollution sources. Characterizing pollution sources gives the public and policy makers the information needed to make changes in order to reduce air pollution.

Figure 1:
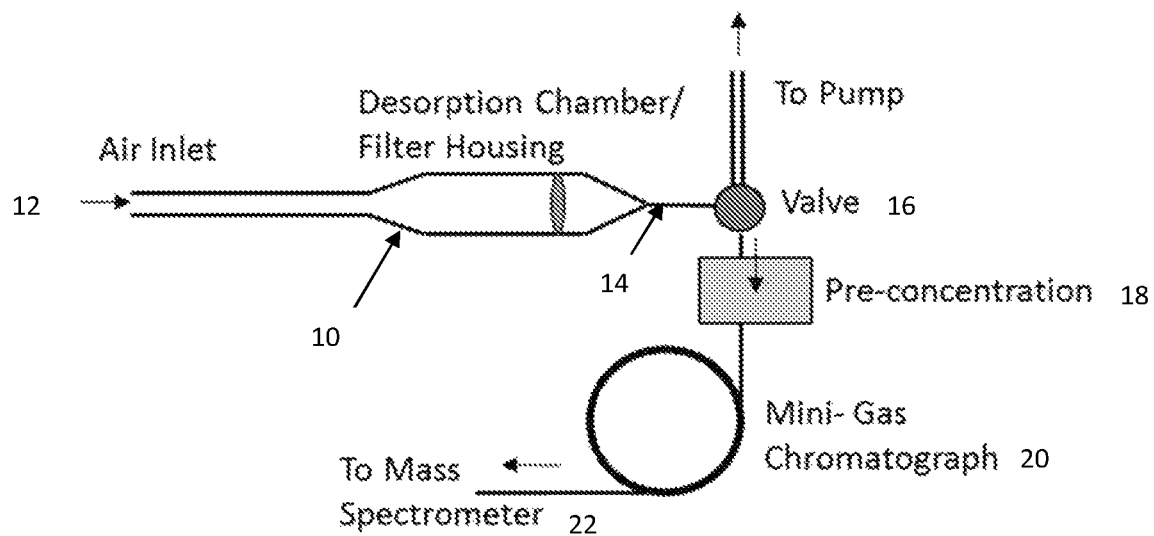
FIG. 1 is a block diagram of an overview of the first embodiment of the invention.
Figure 5:
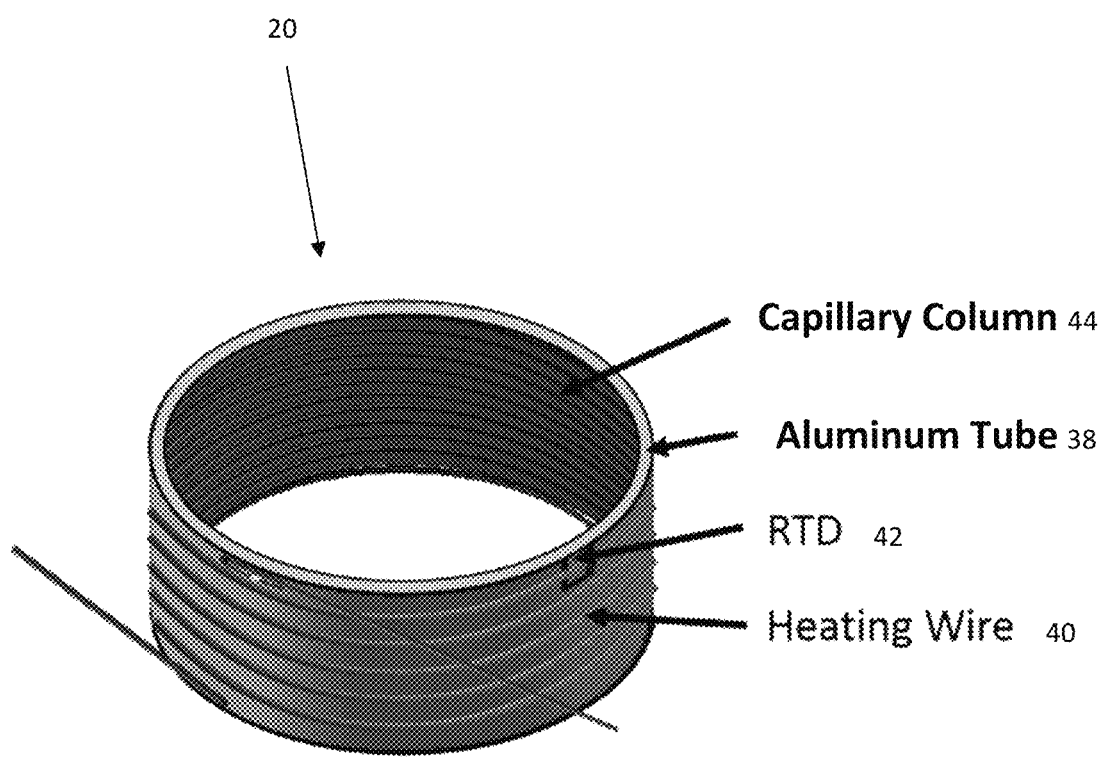
FIG. 5 is a perspective view of a miniature gas chromatograph used in the first embodiment.

A first embodiment of the invention is shown in a block diagram in FIG. 1. FIG. 1 shows a desorption chamber/filter housing 10 having an air inlet 12 and an exit 14 through a transfer line that leads to a 6-port valve 16. The 6-port valve 16 controls flow of a sample from the desorption chamber/filter housing 10 to a pre-concentrator 18. The pre-concentrator 18 sends the sample to a miniature Gas Chromatograph or GC column assembly 20 (which includes a capillary column 44 as shown in FIG. 5), which then sends the sample to a mass spectrometer 22 (not shown).

The pre-concentrator 18 may enhance separation of polar non-volatile compounds and is coupled to the resistively heated GC column assembly 20. This GC column assembly 20 may be relatively fast compared to conventional GC ovens, and may use minimal power. Furthermore, construction of this pre-concentrator 18 and Gas Chromatograph (GC) column assembly 20 may be relatively simple, and may be readily adapted to any applicable injection or detection method. This GC column assembly 20 may be especially useful for in-field GC instrumentation.

Figure 2:
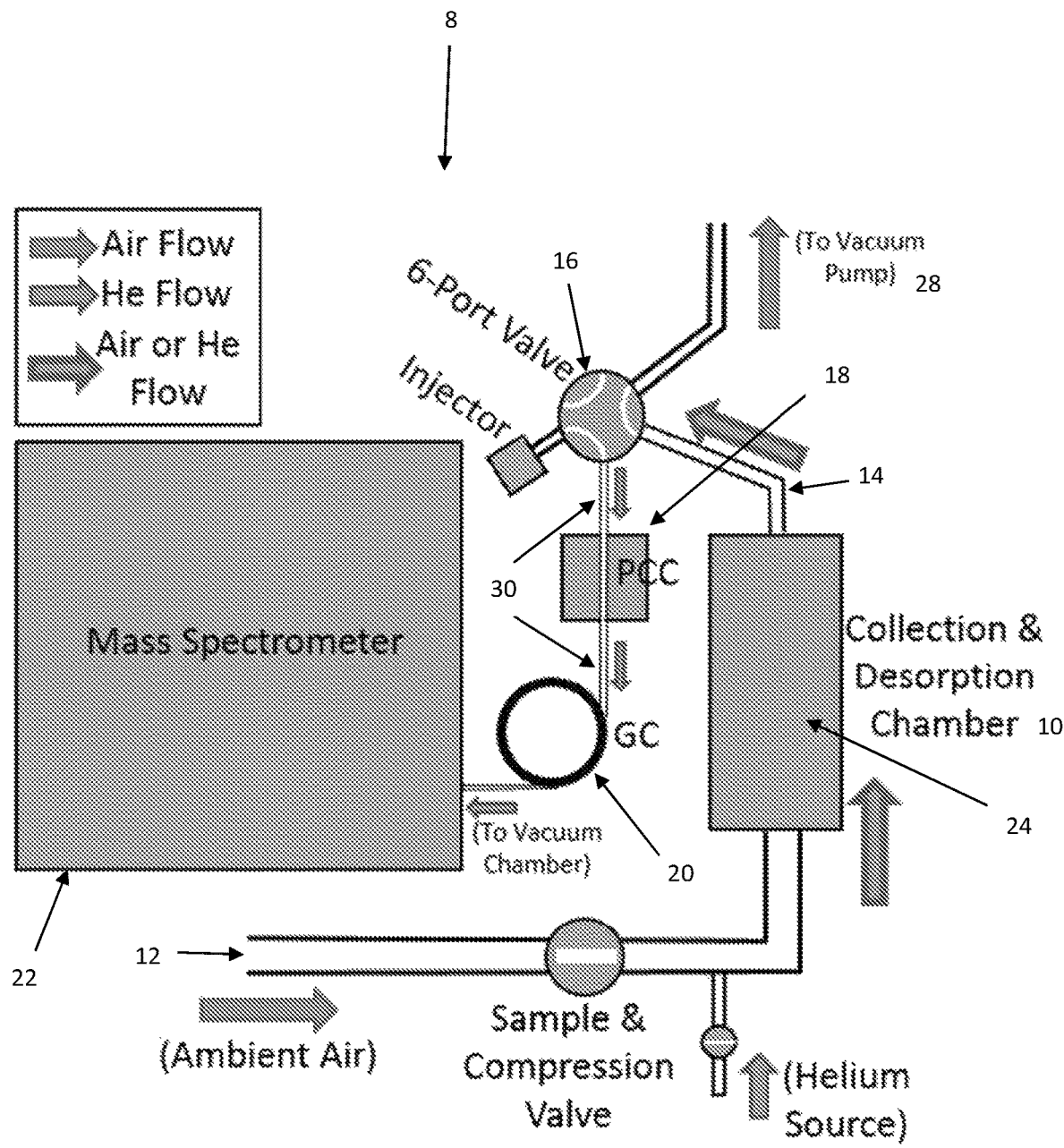
FIG. 2 is a more detailed diagram showing more structure of a first embodiment of the invention.

A more detailed diagram of the first embodiment is shown in FIG. 2. FIG. 2 describes an Organic Aerosol Monitor (OAM) 8 that may combine a collection device with thermal desorption, gas chromatography and mass spectrometry to quantitatively measure semi-volatile components of particulate matter on an hourly averaged basis. PM is among the most harmful air pollutants to human health, but due to its complex chemical composition is poorly characterized. A large fraction of PM is composed of organic compounds, but these compounds are not regularly monitored due to limitations in current sampling techniques.

The OAM 8 of the first embodiment shown in FIG. 2 may be fully automated and has been successfully deployed in the field. The first embodiment may use a deactivated filter for collection followed by thermal desorption and GC-MS analysis. It should be understood that the use of a thermal desorption chamber for ambient air analysis may be a novel element of the first embodiment. Laboratory tests show that detection limits may range from 0.2 to 3 ng for many atmospherically relevant compounds.

The first embodiment was deployed in the field for measurement of the organic markers levoglucosan, dehydroabietic acid, and polycyclic aromatic hydro-carbons (PAHs). Results illustrate the significance of this monitoring technique to clearly characterize PM and identify sources of pollution. However, it should also be understood that the embodiments are not limited to the compounds cited above for examples only.

A first step to be performed is sample collection for the first embodiment. The following dimensions and procedure are for illustration purposes only and should not be considered as limiting of the embodiments.

Figure 3:
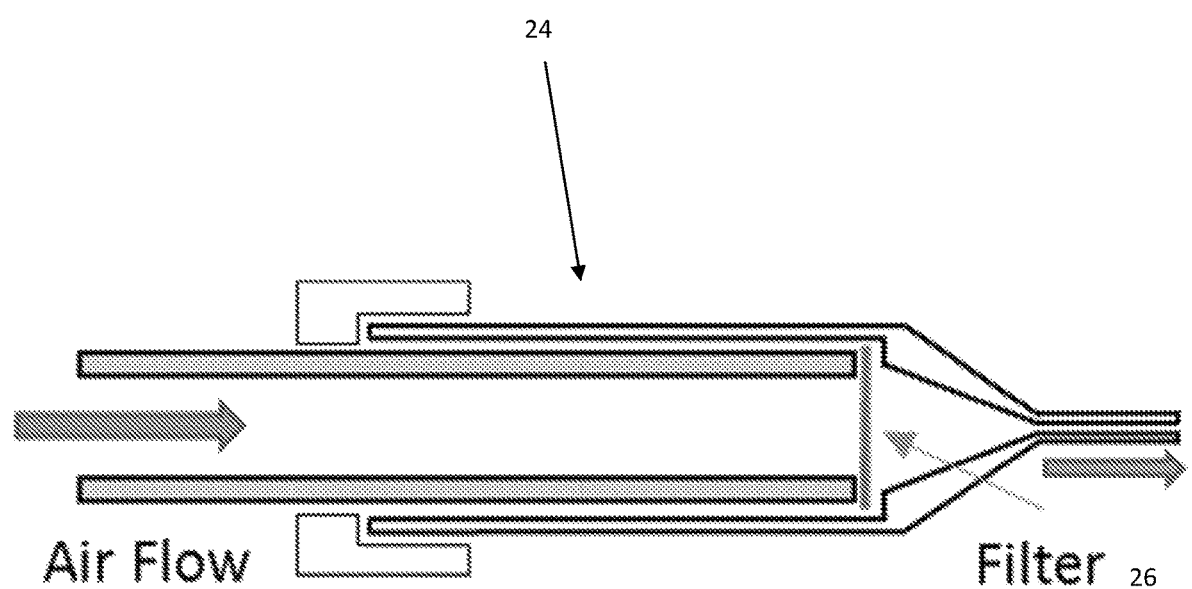
FIG. 3 is a cut-away view of the thermal desorption chamber with a filter for collection an aerosol sample.

A sample may be collected by drawing air with a flow of 4-8 L/min through a PM(2.5) sharp cutoff cyclone filter 24 shown in more detail in FIG. 3. A 0.375 inch (o.d.) 6 ft. long stainless steel tube connects the cyclone cutoff filter 24 from outside, to the OAM 8. PM(2.5) samples are collected on a 0.385 inch diameter chemically deactivated quartz filter 26, which is housed in the collection/thermal desorption chamber 10 shown in FIG. 2. The flow across the filter 26 is obtained using a Gast DOA-P707-AA vacuum pump 28. In order to prevent surface catalyzed pyrolysis, the quartz filter 26 may be de-activated using a solution of 10% hexamethyldisilazane in toluene. This filter 26 is submersed in the silazane solution for 30 minutes, and then rinsed with toluene and dried at room temperature A component of the first embodiment that may not be found in an OAM of the prior art is the thermal desorption chamber 10. The thermal desorption chamber 10 may be made of stainless steel, and may have a compression seal inside to seal the quartz filter 26 as shown in FIG. 3. Air may flow through the quartz filter 26 inside the thermal desorption chamber 10 followed by the 6-port valve 16 shown in FIG. 2.

After a sample is collected the entire thermal desorption chamber 10 may be purged with helium at a flow of 100 mL/min for 3 minutes. After purging, the 6-port valve 16 may rotate and open the thermal desorption chamber 10 to the GC column assembly 20. The thermal desorption chamber 10 may be pressurized to 20 psi, to achieve a flow of approximately 10 mL/min through the thermal desorption chamber and GC column assembly 20. The thermal desorption chamber 10 may be heated at a rate of −150° C./min and the temperature may be held at 150-300° C. (depending on the compounds of interest) for 10 minutes using PID controlled resistive heating. The thermal desorption chamber 10 may be heated using a 22 gauge nichrome heating coil that is wrapped around the outside of the thermal desorption chamber.

The analyte may be transferred through both the 6-port valve 16 and stainless steel transfer lines 30 into the cooled/pre-column concentrating (PCC) region of the pre-concentrator 18 of the transfer line. The transfer line 30 may be referred to as a capillary column 44 when the capillary column is inside the pre-concentrator 18 or the GC column assembly 20. The thermal desorption chamber 10 and some transfer lines 30 may be deactivated to reduce degradation using Inertium (AMCX). The 6-port valve 16 may be deactivated with Sulfinert (Restek).

Figure 4:
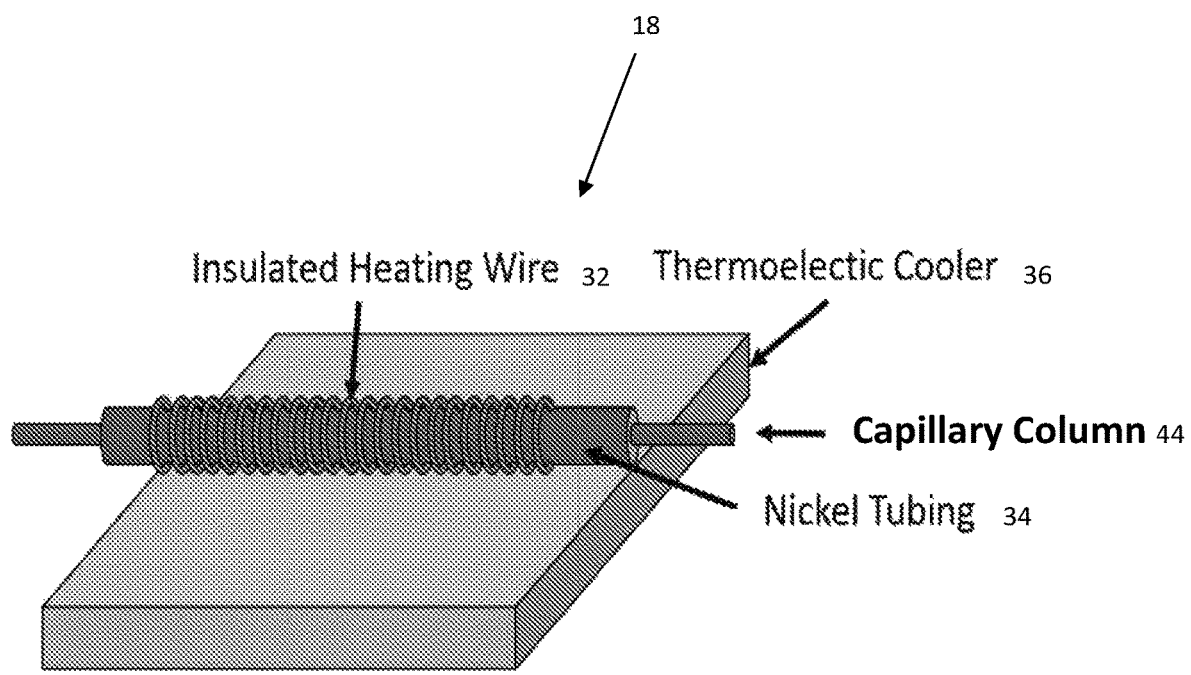
FIG. 4 is a perspective view of a pre-concentrator used in the first embodiment.

FIG. 4 is a detailed view of the pre-concentrator 18 of the first embodiment. An injection port may be used for introducing samples into the system, coupled with the pre-concentrator (PC) 18.

The pre-concentrator 18 may operate by cooling a portion of the capillary column 44 using a thermoelectric device. Resistive heating wire 32 may also be incorporated into the pre-concentrator 18 so that after desorption from the quartz filter 26 is complete, the cooled capillary column 44 may be flash heated, thereby introducing the sample into the GC column assembly 20 to begin separation and analysis. The pre-concentrator 18 may be delayed and may allow the capability of injecting the sample at higher temperatures to improve the chromatography. If pre-concentration occurred at the head of the capillary column 44, beginning the separation at higher GC column assembly 20 temperatures may not be possible, and the sample may begin eluting before desorption off the quartz filter 26 was complete.

Providing additional detail, the pre-concentrator 18 may operate by condensing the less-volatile components of the injected sample on a cooled portion of the capillary column 44. For example, the cooled portion may be 35 mm long, but this length of the capillary column 44 should be seen as an example only and not limiting of the first embodiment. The pre-concentrator 18 may then be flash heated to stimulate injection into the GC column assembly 20.

The pre-concentrator 18 may be programmed with a time delay, starting from the time that the GC column assembly 20 run starts to any time thereafter. In this way it may effectively de-couple the start of the GC column assembly 20 run from manual injection, and provides an alternative to concentrating samples at the head of the column.

Alternatively, the pre-concentrator 18 may be continuously heated to maintain the injection port temperature and thereby used as part of the capillary column 44 to the head of the GC column assembly 20. The pre-concentrator 18 may be assembled by inserting a 35 mm length of the capillary column 44 into a nickel tube 34. For example, a 0.02 in. inner diameter nickel tube 34 may be used. The nickel tube 34 may be tightly wrapped with heating wire 32, such as with 32 gauge Constantine wire, insulated with a double glass layer, and the entire pre-concentrator 18 may be disposed on a Hi-Z thermoelectric cooling device (HZ-2) 36. The thermoelectric cooling device 36 may be disposed on a heat sink that is continuously fan cooled. The thermoelectric cooling device 36 may be a high temperature thermoelectric module, and may be capable of withstanding temperatures up to 350 degrees C.

The pre-concentrator 18 temperature may be measured using a type K thermocouple (not shown) mounted to the outside of the nickel tubing 34, for example, using silica/sodium silicate based adhesive cement (Sauereisen no. 1 paste). The thermocouple may be in direct contact with the nickel tube 34. The outside of the nickel tube 34 may then be wrapped with the insulated heating wire 32. The heating may be controlled using an Omega 4200 series temperature controller. For example, an auto tune function may be used to set the PID variables and the time control period may be set to 0.8 seconds. The controller temperature may be set to 270 degrees C. The temperature of the pre-concentrator 18 may reach 3 degrees C. while cooling, however with the capillary column 44 on, the pre-concentrator 18 may maintain a temperature of 15 degrees C. When the temperature controller is activated, the pre-concentrator 18 may reach 270 degrees C. within 3 seconds, and may maintain a constant temperature with minimal variation.

In this example of the first embodiment, a heated capillary column 44 may connect the pre-concentrator 18 to the head of the capillary column 44 of the GC column assembly 20. The capillary column 44 may be kept at 270 degrees C. The capillary column 44 may be constructed by threading the capillary column through ⅛ inch copper tubing. A thermocouple may be mounted on the outside of the copper and heating wire may be wrapped around the outside of the copper tubing. In this way, an even temperature may be maintained throughout the capillary column 44 due to the high heat conductivity of copper.

FIG. 5 is a perspective view of an example of the structure of the GC column assembly 20 in the first embodiment. The GC column assembly 20 may be composed of an aluminum tube 38, with a single layer of capillary column 44 wrapped on the inside of the aluminum tube. A small lip on the aluminum tube 38 may retain the capillary column 44, and keep it from slipping out. Resistive heating wire 40 may be wrapped on the outside of the aluminum tube 38, and a resistance temperature detector (RTD) 42 may also be mounted on the outside.

This GC column assembly 20 may rely on the high heat conductivity of metals such as aluminum to evenly heat the capillary column 44. The GC column assembly 20 may lead directly into a vacuum chamber of the mass spectrometer 22, where an ion trap and an associated detector analyses the sample.

A more detailed description of the GC column assembly 20 may be as follows, but should be considered as only an example of the possible dimensions being described. The GC column assembly 20 may be comprised of the aluminum tube 38 with a diameter of 40 mm, height of 12 mm, and thickness of >1 mm. The capillary column 44 may be cylindrically wound on the inside of the aluminum tube 38. Small lips (1 mm) on the inside of the aluminum tube 38 further support the capillary column 44 and prevent the capillary column from springing out of the aluminum tube 38.

A miniature RTD device (Omega F2020-100-B) 42 may be used to measure and control the temperature. The RTD 42 may be mounted on the outside of the aluminum tube 38 using ceramic cement. Resistive heating wire may be wound around the outside of the aluminum tube 38. The wire used in the example of this embodiment may be 32 gauge, double glass serve, advance alloy wire, 80 cm in length, with a total resistance of 12 Ohms.

This GC column assembly 20 may utilize the high heat conductivity of aluminum to evenly heat the capillary column 44 located on the inside of the aluminum tube 38. The entire GC column assembly 20 may be wrapped with silver foil to ensure even heating, and to improve the effectiveness of the heating wire 40 by wicking away the heat on all sides. The GC column assembly 20 may also be covered with a layer of polyimide tape. The GC column assembly 20 shown may be 5 meter long, 250 μm I.D. fused silica capillary column 30, with a 0.25 μm thick Rxi-5Sil MS (Restek) stationary phase.

The GC column assembly 20 sends the sample to the mass spectrometer 22. The mass spectrometer may be, for example, a Toroidal Ion Trap Mass Spectrometer. However, it should be understood that any mass spectrometer that is capable of performing the required analysis may be used. In this example, the mass spectrometer may be a modified Guardian 7, manufactured by Torion Technologies. This portable and miniaturized MS system uses a toroidal ion trap. Modifications to the Guardian 7 may include a larger turbo-pump (Pfeiffer TMH 1601 P) to accommodate the helium flow during thermal desorption, and a large column inner diameter. Other modifications may include the GC described above, and software changes performed by Torion Technologies to allow autonomous sampling.

Some of the differences between the embodiments shown in FIGS. 1 to 5 and the prior art may include, but should not be considered as limited to the following. First, the embodiment may incorporate collection by filtration using a deactivated filter, a pre-concentrator 18 for concentrating the sample, and a miniature GC column assembly 20 for fast separation.

Second, pre-concentration on a thermoelectric cooler has not been incorporated in a sampling and analysis system as performed the first embodiment.

Third, the GC column assembly 20 may be different than the prior art in that the aluminum tube 38 may be in direct contact with every point of the capillary column 44, and only a mono-layer of capillary column is used.

Fourth, an injection port may be used, a thermal desorption chamber may be used, the thermal desorption chamber may be deactivated, the filter may be deactivated, a pre-concentrator 18 may be included, an entirely new GC column assembly 20 has been developed as part of the first embodiment, a simplified method of making transfer lines 30 between components may be used, and the embodiment incorporates a VSO valve for the helium source.

Some of the advantages of the embodiment over the prior art include but should not be considered as limited to the following aspects. First, the embodiment includes an injection port for diagnostics, thereby greatly increasing the ease of calibrating the OAM 8 instrument and characterizing its performance. Calibration of the mass spectrometer 22 was either not possible in the prior embodiment or very time consuming since this requires an injection port.

Next, the first embodiment may have no side/sampling arm in the thermal desorption chamber. The side-arm may be a major cause of semi-volatile sample loss through condensation. Accordingly, the first embodiment samples air directly through a 6-port valve 16. The purpose of the 6-port valve 16 and the type of 6-port valve differ in the current embodiment. Using a larger ⅛ inch 6-port valve 16 may enable the sampling of air through the 6-port valve. The 6-port valve 16 may not be used to switch between ovens, but rather it may enable the use of the injection port and it may reduce the amount of other valves that are necessary for operation. This may also mean that much less helium may be used for purge and desorption processes.

Next, the first embodiment uses a pre-concentrator 18, which may enhance gas chromatography for certain compounds and broaden the range of organic compounds that may be trapped on the capillary column 30 due to the cooled portion of the capillary column.

Next, the first embodiment may use a simple and effective GC column assembly 20 for fast separation when compared to the prior art.

Next, while a filter may be used for particle collection and desorption, the quartz fiber filter 26 itself may be inadequate for thermal desorption of many important organic compounds. Thus the use of a deactivated filter and a deactivated thermal desorption chamber 10 may be new to the first embodiment. In particular, deactivation of quartz fiber filters has not been performed previously, or applied in this way.

Next, the incorporation of a VSO valve at the helium source may allow gradual compression of the thermal desorption chamber 10 and preserves the filter. The previous art may have had no way of preserving the filter during compression and decompression.

The first embodiment of the invention describes a GC-MS OAM 8 that may autonomously monitor aerosol or particle phase organics. However, the present invention may also be modified to perform volatile organic compound (VOC) monitoring. This may be accomplished as shown in FIGS. 6 and 7.

The time utilization of the GC-MS OAM 8 may be divided between collection and analysis. The majority of the time may be spent collecting a sample. The following description including time spent on tasks and on physical dimensions is for illustration purposes only and should not be considered as limiting the operation or structure of the second and third embodiments.

Suppose that the OAM 8 may collect a sample over a period of 20 to 45 minutes. Then the OAM may spend 10 to 15 minutes performing the analysis of the aerosol sample that was collected. Therefore, a single cycle of collection, separation and detection may take up to an hour. It was determined that the OAM 8 may be capable of performing analysis of volatile organic compounds (VOCs) in air at the same time as the OAM 8 is performing collection of the aerosol sample from air. Thus, if the OAM 8 may only spend 10 minutes to perform separation and detection of the aerosol component of air, then the time spent collecting the sample for aerosol analysis may be used for separation and detection of the VOCs.

Figure 6:
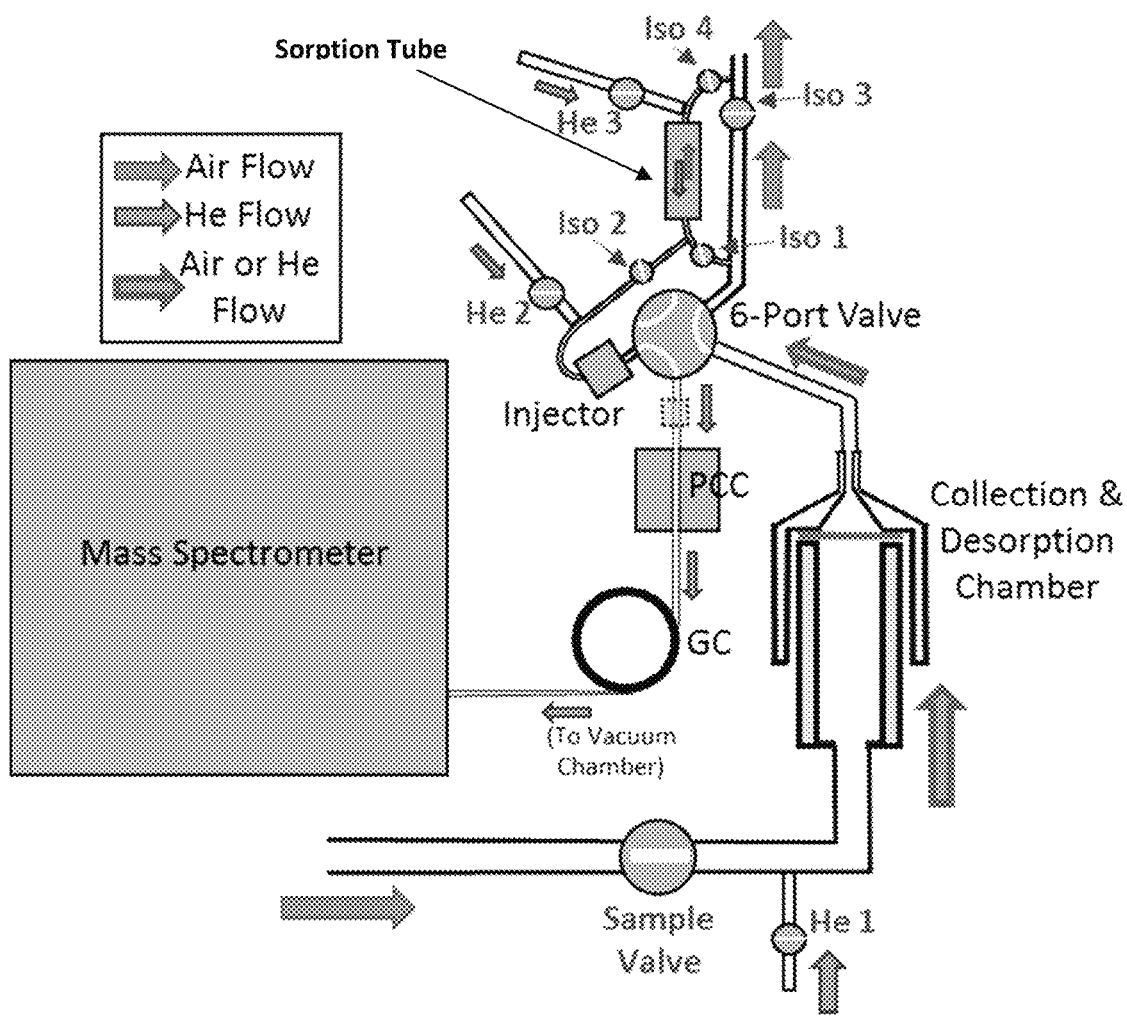
FIG. 6 is a detailed diagram showing structure of a second embodiment of the invention that includes a sorption tube for collecting volatile organic compounds that are not collected by the filter in the thermal desorption chamber.
Figure 7:
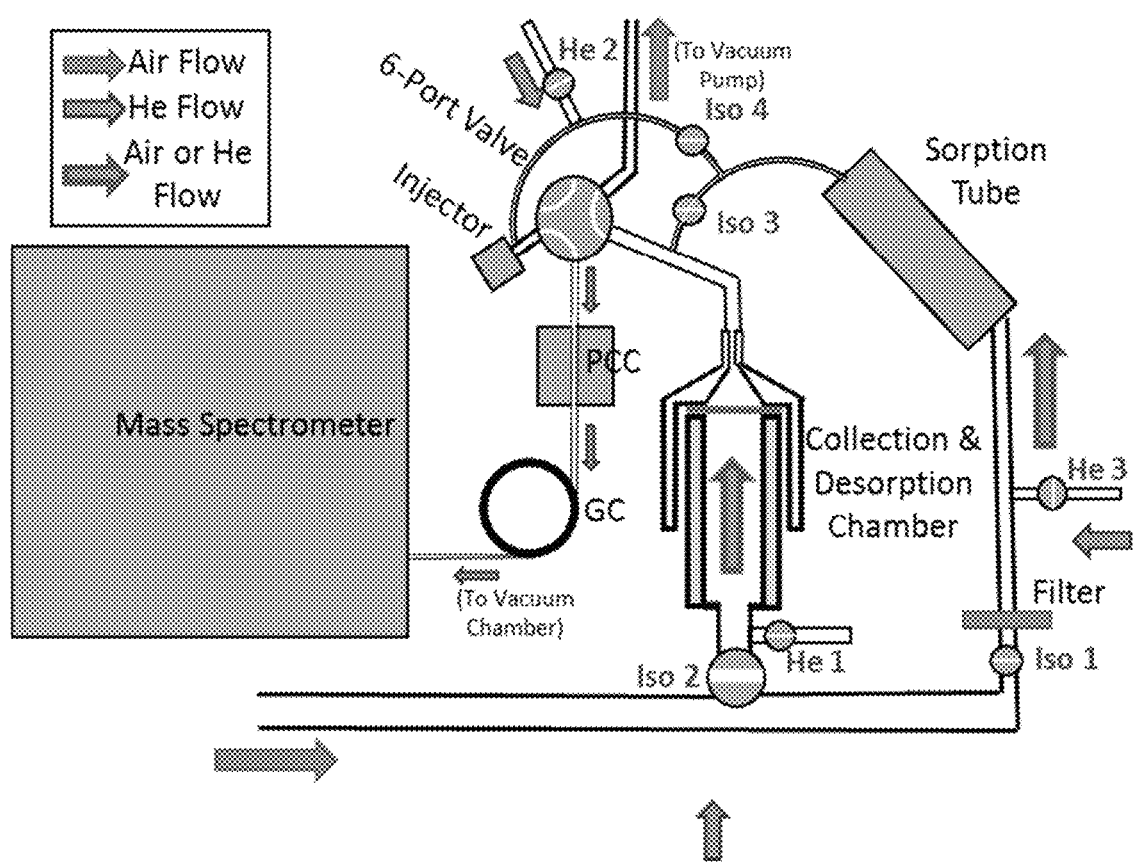
FIG. 7 is a detailed diagram showing structure of a third embodiment of the invention that includes a sorption tube for collecting volatile organic compounds that are not collected by the filter in the thermal desorption chamber.

The second and third embodiments describe the addition of a sorption tube as shown in FIGS. 6 and 7. The sorption tube may be a tube approximately one half inch in diameter that is filled with a sorbent material. The sorbent material may be selected to have an affinity for VOCs, such as activated carbon. While the aerosol particles are caught by the filter in the thermal desorption chamber, the gas phase organics that are more volatile may pass through the filter and become trapped in the sorption tube. After the particle sample is collected in the thermal desorption chamber, the thermal desorption chamber is heated so that the aerosol sample is then swept into the GC and mass spectrometer for separation and detection. When this process is completed, the GC may be cooled so that the VOCs collected in the sorption tube may be analyzed. Accordingly, the sorption tube may be heated and the VOC sample may be swept into the GC and the mass spectrometer for separation and detection.

FIGS. 6 and 7 illustrate second and third embodiments of the invention having different placement of the sorption tube and various valves that enable the two different samples to be analyzed at different times. It should be understood that the second and third embodiments show only two of the possible designs of the OAM 8 that may be constructed to enable a flow to and from the sorption tube to obtain quantitative measurements of the VOCs after particle phase analysis is complete.

In the second embodiment shown in FIG. 6, the following timeline of events is provided to enable operation of the system to perform particle phase and VOC analysis. It should be understood that He1, He2 and He3 refer to the valves that provide helium to the system. Furthermore, Iso1, Iso2, Iso3 and Iso4 refer to isolation valves that control sample and helium flow.

When the system is idle for routine injections and calibration: Iso2 is closed and He2 is open for regular injection in the GC-MS OAM 8 system.

For Sampling: For collection of particles on the filter, and VOCs on the sorption tube, the entire sample flow may be collected through the sorption tube, or just a fraction. The sample valve is open and He1 is closed. The 6-port valve is open between vacuum pump and chamber. Iso1, Iso3 and Iso4 are all open, and the amount of flow split to the sorption tube is controlled. Iso2 is closed. He2 is open for continuous helium flow to the GC column assembly 20, and He3 is closed.

For Particle Desorption & Analysis: The Sample Valve is closed. He1 is open and the chamber is compressed and heated. The 6-port valve is open between the chamber and the PCC/GC. Iso1, Iso2, and Iso4 are closed as the sample in the sorption tube awaits analysis.

For VOC Desorption & Analysis: Helium is used to transfer the sample from the sorption tube to the GC-MS, while the sorption tube is heated to release the VOCs. The 6-Port valve is open between the Injector and the PCC/GC. Iso1 and Iso4 are closed, He3 is open, Iso2 is open and He2 is closed.

For the third embodiment shown in FIG. 7, it should be noted that an extra filter may need to be disposed between Iso1 and the sorption tube as shown.

For idling when performing routine injections and calibration: Iso4 is closed, and He2 is open for regular injection into the GC-MS system.

For Sampling: For collection of particles on the filter, and VOCs on the sorption tube. The sample flow is split between the chamber and the sorption tube. Iso1, Iso2, Iso3 are open and the amount of flow split to the sorption tube is controlled. He1, and He3 and Iso4 are closed. The 6-port valve is open between the vacuum pump and the chamber.

For Particle Desorption & Analysis: The Sample Valve is closed. He1 is open and the chamber is compressed and heated. The 6-port valve is open between the chamber and the PCC/GC. Iso1, Iso3 and Iso4 are closed as the sample in sorption tube awaits analysis.

For VOC Desorption & Analysis: Helium may be used to transfer the sample from the sorption tube to the GC-MS, while the sorption tube is heated to release the VOCs. The 6-Port valve is open between the Injector and the PCC/GC. Iso1, Iso3 and He2 are closed. He3 is open and Iso4 is open.

It should be understood that all temperatures and dimensions cited in this document are for illustration purposes only for embodiments of the invention and should not be considered to be limiting of the temperatures and dimensions that may be used in other embodiments. Accordingly, modifications to the temperatures and dimensions should be considered to be within the scope of the embodiments of the invention.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. An ambient air sampling system for automated and continuous sampling, separating and detecting organic compounds including aerosol particles and volatile organic compounds, said system comprised of:
   an air inlet;
   a thermal desorption chamber coupled to the air inlet for receiving, collecting and desorbing a sample of aerosol particles from the ambient air, wherein the thermal desorption chamber also includes at least one deactivated filter;
   a sorption tube for collecting and desorbing a sample of volatile organic compounds;
   a pre-concentrator for receiving the sample of aerosol particles from the thermal desorption chamber and the sample of volatile organic compounds separate from the aerosol particles, and cooling each sample to thereby concentrate the samples;
   a gas chromatograph for receiving the concentrated samples and analyzing the samples separately; and
   an ion trap mass spectrometer for receiving the samples from the gas chromatograph and analyzing the samples separately.

2. The system as defined in claim 1 wherein the pre-concentrator is further comprised of a thermoelectric cooler for cooling each sample.

3. The system as defined in claim 1 wherein the pre-concentrator is further comprised of a heating element to thereby flash heat each sample for introduction into the gas chromatograph.

4. The system as defined in claim 1 wherein the pre-concentrator is further comprised of a delay counter in order to enable injecting each sample into the gas chromatograph at higher temperatures to thereby improve analysis of the sample.

5. The system as defined in claim 1 wherein the deactivated filter is further comprised of a quartz fiber filter.

6. The system as defined in claim 1 wherein the gas chromatograph is further comprised of:
   an aluminum tube;
   a single layer of capillary column disposed against the inside of the aluminum tube to form a coil, the aluminum tube having a small lip on outer edges for retaining the capillary column inside the aluminum tube;
   a heating device disposed on the outside of the aluminum tube; and
   a temperature detector disposed on the outside of the aluminum tube to monitor a temperature of the heating device.

7. The system as defined in claim 1 wherein the thermal desorption chamber is further comprised of a deactivated thermal desorption chamber.

8. The system as defined in claim 1 wherein the system is further comprised of an injection port, wherein the injection port enables diagnostics for calibrating and characterizing performance.

9. The system as defined in claim 1 wherein the system is further comprised of a valve disposed between the thermal desorption chamber and the pre-concentrator, wherein the valve enables gradual compression of the thermal desorption chamber to thereby preserve the at least one deactivated filter.

\* \* \* \* \*